US006657957B1

(12) United States Patent
Cheung et al.

(10) Patent No.: US 6,657,957 B1
(45) Date of Patent: Dec. 2, 2003

(54) METHOD AND APPARATUS FOR DYNAMICALLY CONTROLLING THE ADMISSION OF CALLS TO A NETWORK

(75) Inventors: Hay Yeung Cheung, Holmdel, NJ (US); Louise E. Hosseini-Nasab, Holmdel, NJ (US); Daniel J. Yaniro, Jr., Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/320,551

(22) Filed: Dec. 17, 2002

Related U.S. Application Data

(63) Continuation of application No. 09/303,305, filed on Apr. 30, 1999, now Pat. No. 6,515,964.
(60) Provisional application No. 60/114,150, filed on Dec. 29, 1998.

(51) Int. Cl.[7] ............................................. H04L 12/56
(52) U.S. Cl. ...................... 370/230; 370/252; 370/352
(58) Field of Search ................................. 370/230, 238, 370/252, 352, 353, 354, 355, 356

(56) References Cited

U.S. PATENT DOCUMENTS

| 5,193,151 A | 3/1993 | Jain |
| 5,400,329 A | 3/1995 | Tokura et al. |
| 5,732,078 A | 3/1998 | Arango |
| 5,796,719 A | 8/1998 | Peris et al. |
| 6,064,653 A | 5/2000 | Farris |
| 6,192,031 B1 | 2/2001 | Reeder et al. |
| 6,222,824 B1 | 4/2001 | Marin et al. |
| 6,226,266 B1 | 5/2001 | Garland et al. |
| 6,282,192 B1 | 8/2001 | Murphy et al. |
| 6,377,573 B1 | 4/2002 | Shaffer et al. |

OTHER PUBLICATIONS

Gordon, Shykeh, H.323: The Multimedia Communications Standard Moves From Consensus To Compliance, CTI Developer, 2(2):108–113.
Blank, Michelle, H.323 Gatekeepers: Essential Software for IP Telephony and Multimedia Conferencing, CTI Developer, pp. 94–98, Feb. 1998.
VCON Videoconferencing, White Paper, H.323 Standard, pp. 1–21, Jan. 1998.
Wroclawski, J., RFC 2211 Specification of the Controlled–Load Network Element Service, MIT LCS, pp. 1–19, Sep. 1997.
Shenker, et al., RFC 2212 Specification of Guaranteed Quality of Service, p. 1–20, Sep. 1997.
International Telecommunication Union, H.323, Series H: Audiovisual and Multimedia Systems: Infrastructure of Audiovisual Services, Visual Telephone Systems and Equipment for Local Area Networks Which Provide A Non–Guaranteed Quality of Service, pp. 79, Nov. 1996.

*Primary Examiner*—Chau Nguyen
*Assistant Examiner*—Keith George

(57) ABSTRACT

A network call admission control system receives a call and determines a call characteristic requirement and a network characteristic parameter. The call is admitted to the network based in part on whether the call characteristic requirement is satisfied by the network characteristic parameter. As a result, a communications service provider can provide a high quality of service for completed calls or charge a discounted rate for completed calls not meeting a certain quality of service.

20 Claims, 6 Drawing Sheets

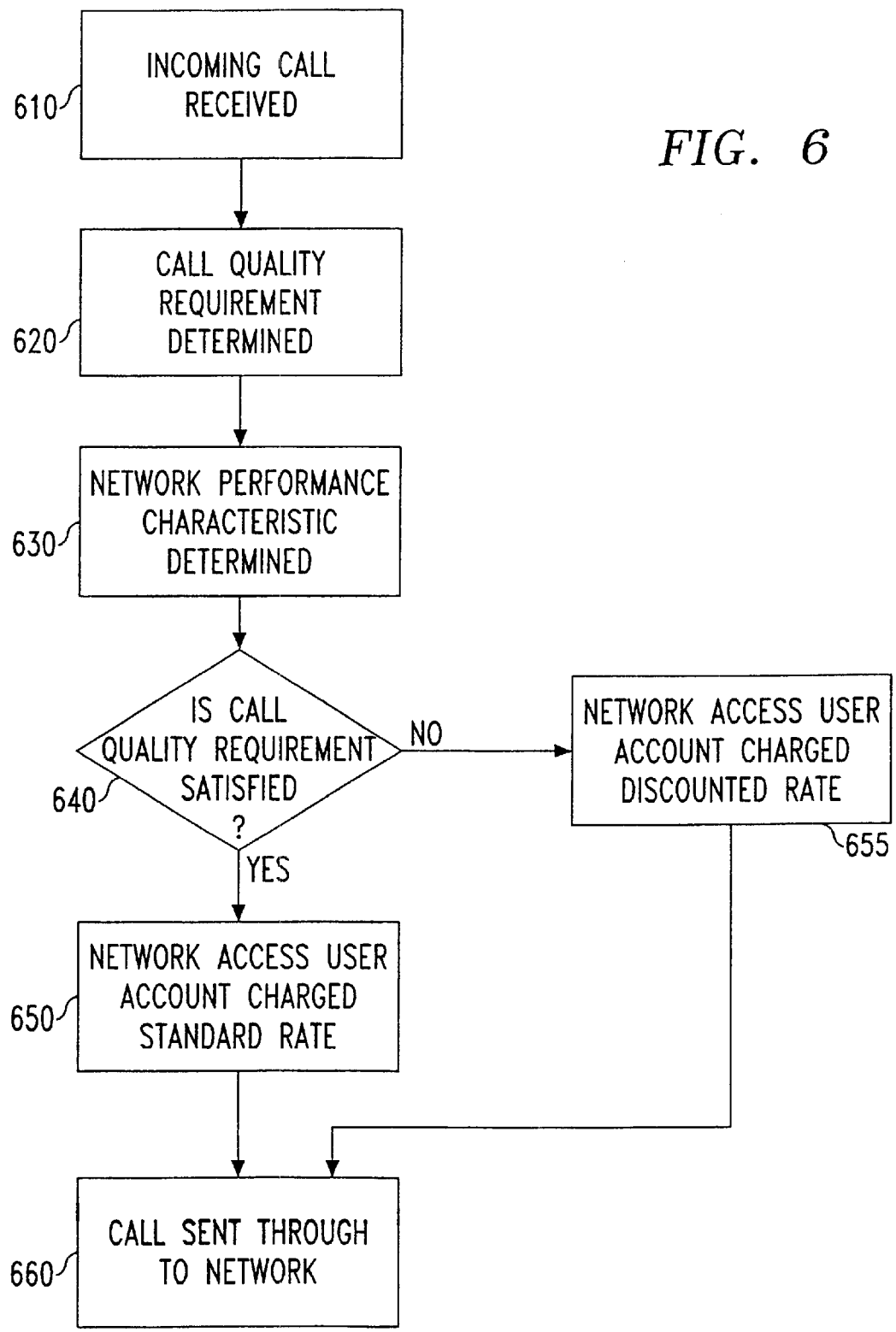

METHOD AND APPARATUS FOR DYNAMICALLY CONTROLLING THE ADMISSION OF CALLS TO A NETWORK

CROSS REFERENCE TO RELATED APPLICATION

This application is a continuation of U.S. application Ser. No. 09/303,305 filed on Apr. 30, 1999 now U.S. Pat. No. 6,515,964 which claims the benefit of U.S. Provisional Patent Application No. 60/114,150 entitled "Method and Apparatus for Dynamically Controlling the Admission of Calls to a Network" and filed on Dec. 29, 1998, the subject matter of both which is incorporated by reference.

FIELD OF THE INVENTION

The invention relates to network call admission. More particularly, the invention relates to a method and apparatus for dynamically controlling the admission of calls to a network.

BACKGROUND OF THE INVENTION

The present invention relates to a technique for dynamically controlling the admission of traffic to a network based in part on the state of the network.

One known type of network is an Internet Protocol ("IP") network. An IP network implements the protocol specified in RFC 791, Internet Protocol One type of traffic carried by known IP networks is voice traffic, called Voice over IP ("VoIP") traffic.

FIG. 1 is an example of a prior art VoIP system. It is known to initiate a voice call from a phone set 1 over a conventional circuit-switched network 21 (such as the public switched telephone network (PSTN)) and route the calling party's voice signals to a first gateway 11 connected to the IP network 23. The first gateway 11 packetizes the voice signals using the Internet Protocol and transmits the packets as VoIP traffic over the IP network 23 to a second gateway 12 closer to the called party than the first gateway 11. The packets are converted back into voice signals at the second gateway 12, and those voice signals are routed via the conventional circuit-switched network 22, to the called party's phone set 2.

One of the problems with VoIP services is latency. Latency is the delay between the time a signal is sent and the time it is received. Latency adversely affects the quality of service of real-time communications (e.g., voice communications) and is dependent upon the state of the network over which the communications are carried. For example, a heavily burdened network is likely to have more latency than an underutilized network.

A similar problem arises in the context of users making other types of calls over a packet-switched network, such as the Internet. At present, a user can be connected to the Internet by an Internet Service Provider (ISP) and can make a number of calls over the Internet via HTTP (Hypertext Transfer Protocol) commands (using a Web browser such as Microsoft Internet Explorer or Netscape Navigator), FTP (File Transfer Protocol) commands, TELNET connections, and the like. The user may encounter significant delays in accessing, for example, Web sites. Those delays can be caused by a number of factors, including a Web site's inability to respond to all of the users that concurrently seek information from that Web site. A user also may experience significant delays in accessing a particular Web site, not due to that Web site's inability to meet the demand for that site, but due to poor performance characteristics of one or more networks which couple the user to the Web site, or the internetwork routers.

In known VoIP systems, a gateway will pass traffic into a network whenever the gateway has an incoming port that is available to do so. Thus, certain networks must disadvantageously be over-engineered to be able to carry a peak load equal to the traffic that flows when all of the ports of all of the gateways connected to the network are in use. If the traffic sent through the network approaches or exceeds the network's capacity, then the network disadvantageously drops packets (i.e., experiences packet loss) and/or introduces unacceptable delays into communications. In known networks, it is difficult or impossible to guarantee a high quality of service when the network is operating near or at its capacity.

The International Telecommunications Union ("ITU") has established the H.323 standard, which encompasses audio, video and data communications across packet-switched networks, such as the Internet. The H.323 standard was principally developed and established to allow multimedia products and applications from multiple vendors to interoperate. H.323 systems may include a gatekeeper, which can provide bandwidth management. For example, the gatekeeper can reject calls from a terminal if it determines that sufficient bandwidth is not available. H.323 bandwidth management also operates during an active call if a terminal requests additional bandwidth, and the gatekeeper may grant or deny the request for additional bandwidth. Likewise, there are other Internet protocols that provide for establishing or rejecting calls based on bandwidth requirements (e.g., RFC 2211, Specification of the Controlled-Load Network Element Service, RFC 2210, The Use of RSVP with IETF Integrated Services, these bandwidth management protocols do not provide for admitting or rejecting calls based on delay characteristics of the network.

SUMMARY OF THE INVENTION

The present invention provides a system for regulating the call traffic into a packet-switched network based in part upon delay characteristics of the network. In an embodiment of the present invention, a call delay characteristic requirement for a call is determined, a delay characteristic parameter of the packet-switched networks is determined, and a call action based at least partly upon the determined delay characteristic requirement and the determined delay characteristic parameter is performed.

In one embodiment of the invention, the network is an Internet Protocol (IP) network carrying Voice over IP (VoIP) traffic. A voice call made in connection with a VoIP service is not admitted to the IP network and is held if one or more current delay characteristic parameters of the IP network do not satisfy one or more prescribed delay characteristic requirements. Delay characteristic parameters can be periodically updated, and when the current value of one or more delay characteristic parameters satisfy one or more prescribed delay requirements, the VoIP call is admitted to the IP network.

Another embodiment of the present invention dynamically controls the admission of other traffic to an IP network, including multimedia commnunications, HTTP commands, FTP commands, TELNET connections, and the like. This embodiment allows such data calls to be admitted to the IP network when the IP network satisfies the delay requirements.

BRIEF DESCRIPTION OF THE DRAWINGS

FIG. 6 is a flowchart illustrating a method in accordance with an embodiment of the present invention that can be utilized as part of a service that markets a certain level of network performance to network users placing calls over the network.

DETAILED DESCRIPTION

Figure 1:
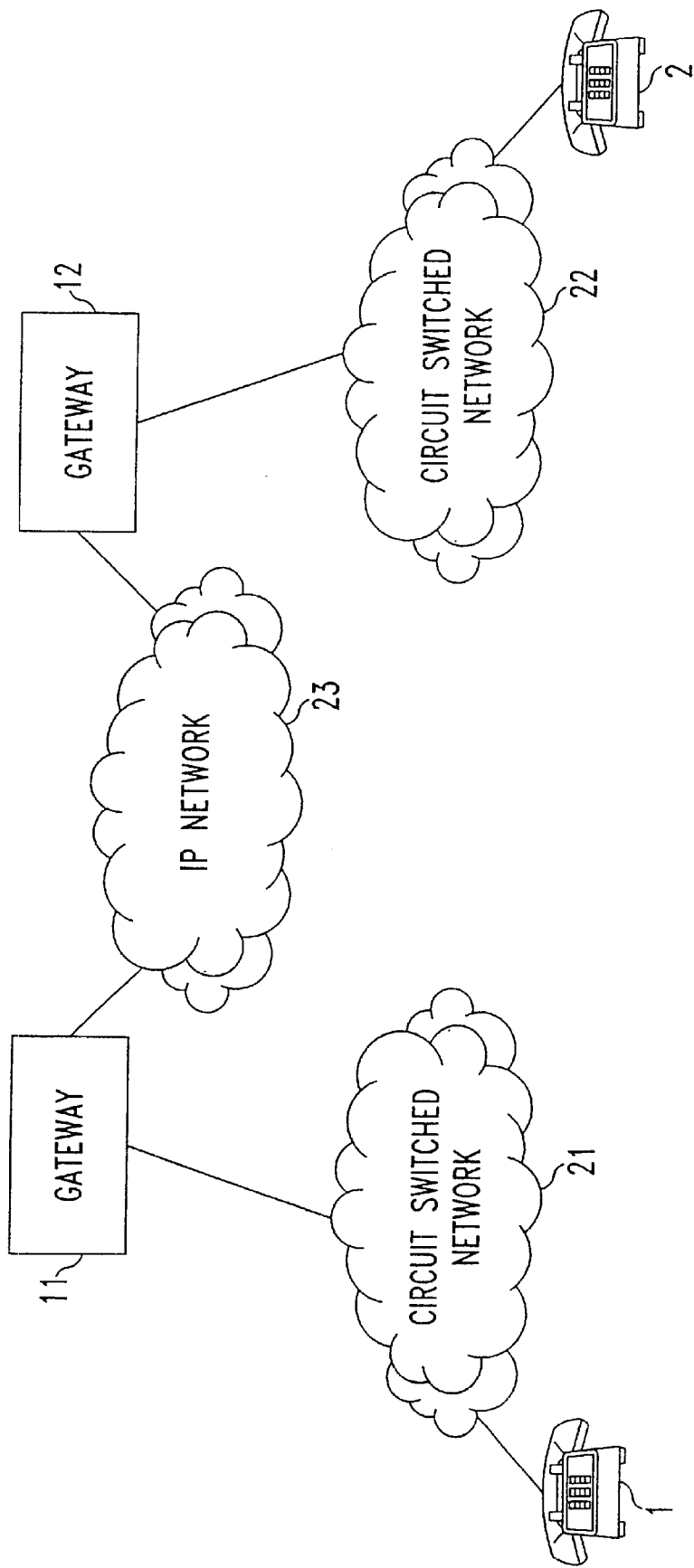
FIG. 1 is an illustration of a prior art Voice over IP system.

A method and apparatus for dynamically controlling the admission of calls to a packet-switched network is described. In the following description, for purposes of explanation, numerous specific details are set forth to provide a thorough understanding of the present invention. It will be obvious, however, to one skilled in the art that the present invention may be practiced without these specific details. In other instances, well known structures and devices are shown in block diagram form and process steps are shown in flowcharts to describe the present invention. Furthermore, it is readily apparent to one skilled in the art that the specific sequences in which steps are presented and performed are illustrative and it is contemplated that the sequences can be varied and still remain within the spirit and scope of the present invention.

A packet-switched network is meant to encompass any network that routes information in the form of discrete packets. For example, a packet may have a header and a payload. The header can include routing and contextual information, which can include the sender's address, the destination address, and a packet number that indicates the packet's place in a series of packets that together comprise a set of information such as a message or a file. Packets can be routed in a connectionless or connection-oriented fashion. In a connectionless protocol such as the Internet Protocol, the path taken by a packet is determined at each router based upon the packet's destination address and conditions in the network. In a connection-oriented protocol, such as the Asynchronous Transfer Mode ("ATM") protocol, a packet is routed along a predetermined path (a circuit) through the network based upon a circuit number that is assigned to the packet. As used herein, the term "packet-switched network" is meant to encompass connectionless packet-switched networks, connection-oriented networks, and any network that employs a combination of connectionless and connection-oriented protocols to route packets.

As used to describe the present invention, a call is meant to encompass any communication that is carried by a network between entities that are coupled by that network. An entity is anything adapted to utilize a network to communicate with any other entity. Examples of an entity include a telephone, a computer, a facsimile machine, etc. For example, a voice call includes a communication that is carried by a network between a calling party and a called party. As used herein, admitting a call to a network means permitting the network to carry the call.

In an embodiment of the present invention, a calling party initiates a voice call over a conventional circuit-switched network. The incoming voice call is routed over a circuit-switched network from the calling party to a gateway. The gateway decides whether to admit the call to the packet-switched network based in part on the state of the packet-switched network. For example, if the network is already overburdened, the gateway will not admit the call to the network. If, on the other hand, the network can carry the call with an appropriate quality of service, the gateway will admit the call to the network.

The state of a packet-switched network can be indicated by a number of performance parameters, including total delay, mean and standard deviation for such delay, packet loss, error rate, etc. These network characteristic parameters can be determined by methods well known in the art. For example, total delay is the time interval from when one party utters a sound to when the other party hears that sound. It can be determined by methods well known in the art including the timed transmission of audible tones. Packet loss is the percentage of packets transmitted but not received, and can be measured by sending a known set of packets and determining how many are received.

Call quality requirements for the various performance parameters of the packet-switched network (e.g., total delay, mean and standard deviation for such delay, and packet loss) can be established to enable a higher quality of service for certain calls. For example, one delay characteristic requirement is a typical delay requirement, which can require that the network's typical delay parameter be below a certain maximum value before the gateway admits the call to the packet-switched network. As used to describe the call delay characteristic requirements and network delay characteristic parameters, the meaning of the term "typical delay" encompasses an average delay, a mean delay, a median delay, an arithmetic mean delay, a weighted average delay, and other derived delay values that represent a practicable expected delay value. For example, one type of a typical delay requirement is a maximum mean delay requirement, and one type of a typical delay parameter is a mean delay parameter.

Another call delay characteristic requirement is a delay variation requirement, which can require that the network's delay variation parameter be below a certain maximum value before the gateway admits the call to the packet-switched network. As used herein, the meaning of the term "delay variation" encompasses a delay standard deviation, other order moments of the delay distribution, a delay variance, a delay coefficient of skewness, a delay kurtosis, a delay covariance, a delay range, a delay standard error, a delay maximum, a delay minimum, and other derived delay values that represent a practicable delay variation value. For example, one type of a delay variation requirement is a maximum delay standard deviation requirement, and one type of a delay variation parameter is a delay standard deviation parameter.

A call quality requirement (e.g., delay characteristic requirement) may be particular to certain types of calls, call services, the calling party, the called party, and other call differentiations known to one skilled in the art.

Each incoming voice call to the packet-switched network can be held if the current values of the performance parameters are outside the prescribed call quality requirements. As each incoming call is held, actual values of the performance parameters are updated. Various call actions can be taken while the voice call is held (e.g., sending a wait message to the calling party, sending the calling party a ringing message), and various call actions can be taken if the voice call cannot be admitted to the packet-switched network (e.g., holding the voice call, sending the calling party a busy signal, providing the calling party the option of having the system call him or her back when the VoIP call can be admitted to the network, or rerouting the voice call over another network, such as a conventional circuit-switched network). Voice calls are admitted to the packet-switched network when the current values of the performance parameters are within the prescribed call quality requirements. Once a voice call is admitted to the packet-switched network, all packets associated with the call can be permitted to proceed back and forth through the network as the calling party and called party converse.

While one embodiment of the present invention concerns VoIP services, other embodiments of the present invention concern the admission of any type of call to a packet-switched network. Other types of calls encompassed by the present invention include multimedia communications (e.g., video phone calls), HTTP commands, FTP commands, TELNET connections, and other calls that concern the transmission of data across a packet-switched network. As used to describe the present invention, multimedia communications include audio, video, graphics, animation, facsimile, text communication, and any combination thereof.

Figure 2:
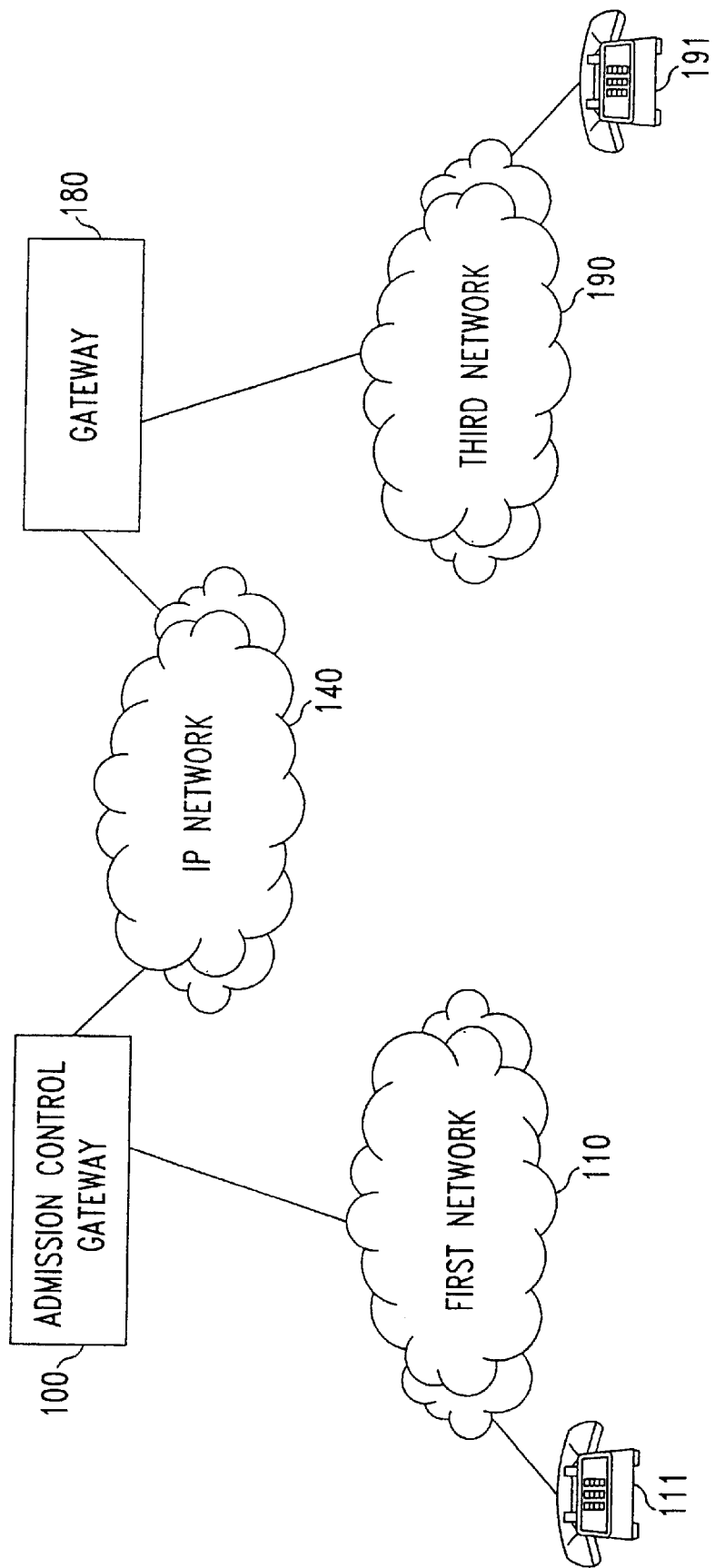
FIG. 2 shows a system in accordance with an embodiment of the present invention.

FIG. 2 shows a VoIP system which operates in accordance with an embodiment of the present invention. Referring to FIG. 2, the system includes an admission control gateway 100 that is coupled to a first network 110, such as a PSTN or a private branch exchange (PBX). Connected to the first network 110 is a telephony station 111. Examples of such a telephony station include a conventional telephone, a wireless telephone station, a personal computer system with a microphone and headphones, a video conferencing system, a facsimile machine containing a phone handset, etc. The admission control gateway 100 is also coupled to an IP network 140, which is also connected to a second gateway 180. A third network 190 is connected to the second gateway 180 and to a telephony station 191. Networks 110 and 190 may be separate telephone networks or different parts of the same telephone network.

Admission control gateway 100 performs functions that are well known in the art, including receiving from the first network 110 voice signals from a voice call initiated at telephony station 111, packetizing the voice signals using the Internet Protocol, and transmitting the packets over the IP network 140. Gateway 180 also performs functions that are well known in the art, including receiving from the IP network 140 packets containing packetized voice signals, converting those packets into voice signals, and routing the voice signals over the third network 190 to the called telephony station 191. Moreover, gateways 100 and 180 can receive and route other data calls, such as those associated with multimedia communications, HTTP commands, FTP commands, TELNET connections, etc. As used to describe the present invention, the admission control gateway 100 receives one type of a data call when it receives data from the first network 110 to be transmitted over the IP network 140. A gateway to a packet-switched network also receives a data call when it receives packets of data from another network (e.g., a conventional circuit-switched network, an ATM network, an IP network, etc.) to be transmitted over the packet-switched network. Each gateway can also accumulate data parameters about the network and the current traffic, including network performance parameters, e.g., by polling every other gateway in the network and/or receiving data from network components, such as routers (not shown). Hence, each gateway is able to keep or access up-to-date network data parameters.

The admission control gateway 100 can place dynamic controls on the calls that are to be admitted to the IP network 140 at any given time. Quality of service can be monitored and access controlled to allow calls into the IP network when acceptable service is assured. Call quality for Voice over IP calls can thereby be maintained at an acceptable level. Customer complaints regarding poor quality calls can be reduced. Overengineering of facilities and other resources can be minimized, saving capital and expense.

Figure 3:
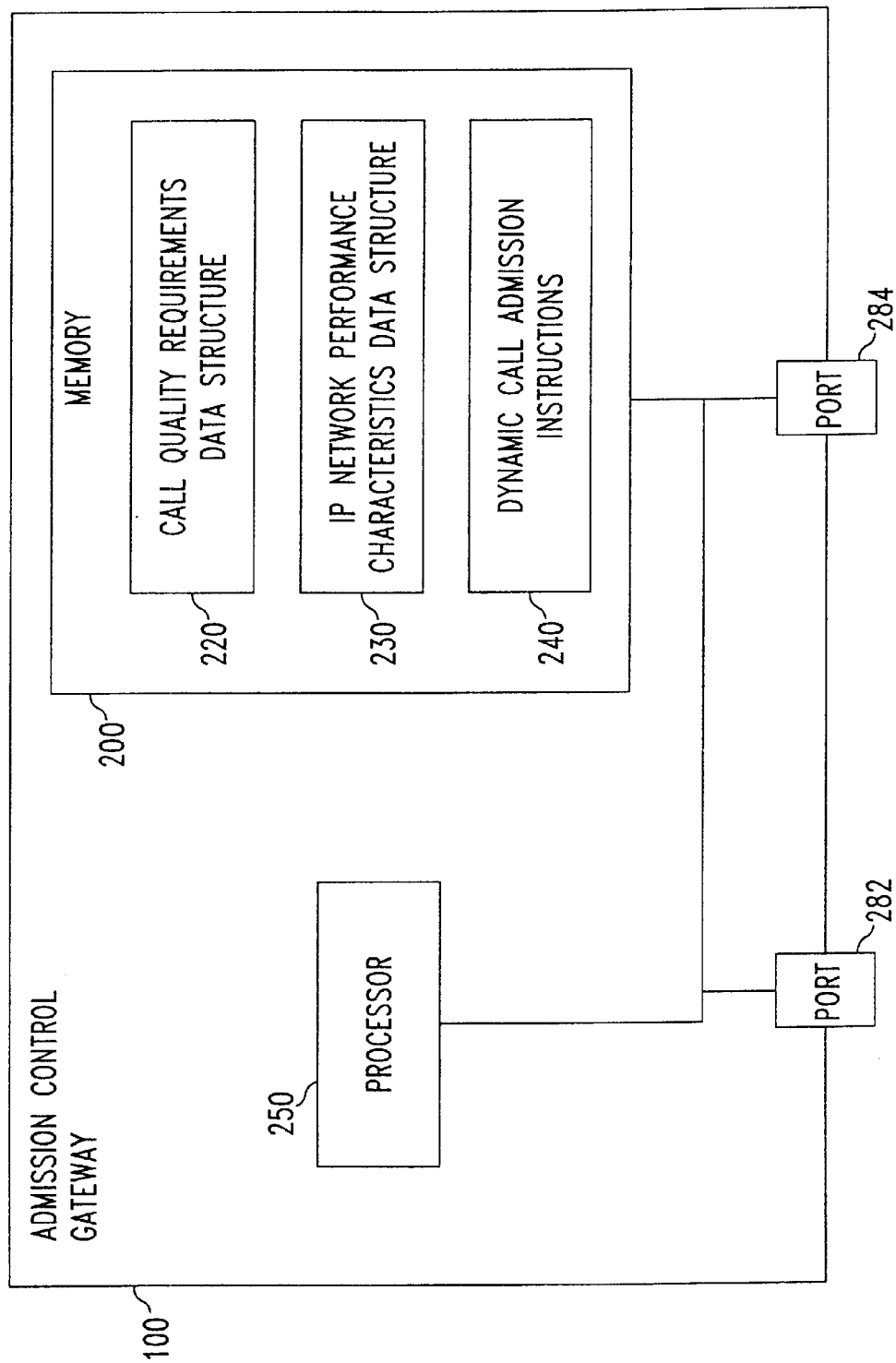
FIG. 3 shows an apparatus in accordance with an embodiment of the present invention.

Referring to FIG. 3, the admission control gateway 100 includes a processor 250 and a memory 200. The processor 250 in one embodiment is a general purpose microprocessor, such as the Pentium II processor manufactured by the Intel Corporation of Santa Clara, Calif. In another embodiment, the processor 250 is an Application Specific Integrated Circuit (ASIC), which has been designed to perform in hardware and firmware at least part of the method in accordance with an embodiment of the present invention. Memory 200 is any device adapted to store digital information, such as Random Access Memory (RAM), flash memory, a hard disk, an optical digital storage device, any combination thereof, etc. As shown in FIG. 3, memory 200 is coupled to processor 250, a port 282 adapted to be coupled to a sender of a call (e.g., a circuit-switched network), and a port 284 adapted to be coupled to a packet-switched network. The term "coupled" means connected directly or indirectly. Thus, A is "coupled" to C if A is directly connected to C, and A is "coupled" to C if A is connected directly to B, and B is directly connected to C.

In accordance with one embodiment of the present invention, dynamic network call admission instructions are stored on a medium and distributed as software. The medium is any device adapted to store digital information, and corresponds to memory 200. For example, a medium is a portable magnetic disk, such as a floppy disk; or a Zip disk, manufactured by the Iomega Corporation of Roy, Utah; or a Compact Disk Read Only Memory (CD-ROM) as is known in the art for distributing software. The medium is distributed to a user that has a processor suitable for executing the dynamic network call admission instructions, e.g., to a user with a gateway having a processor, memory, a port adapted to be coupled to a circuit-switched network, and a port adapted to be coupled to a packet-switched network.

Exemplary data structures and instructions adapted to be executed by a processor stored in the memory 200 include the call quality requirements data structure 220, the packet-switched network performance parameters data structure 230, and the dynamic call admission instructions 240.

The call quality requirements data structure 220 can contain the call quality requirements for all calls, certain types of calls, and/or each individual call. For example, a call may have a maximum delay bound, d, for call connection. The delay, d, has mean $\mu$ and standard deviation $\sigma$. A maximum bound for packet loss, defined by $\rho$, can also be included in the call quality requirements data structure 220. Other maximum bounds may be established for error rates and other network performance parameters concerning the IP network, current network traffic and projected network traffic. The call quality requirements data (e.g., the maximum delay bound d) can be predetermined for all calls received by the gateway and stored in the call quality requirements data structure 220. Alternatively, the call quality requirements data may be stored in a lookup table that specifies certain call quality requirements for certain types of calls, specific calling parties, specific called parties, etc. For example, the call quality requirements data structure 220 can contain a lookup table indexed according Automatic Number Information (ANI) of the call. The gateway utilizes the calling party's ANI to determine the call quality requirements data for that call from the lookup table. Furthermore, the call quality requirements data can vary for each call by including the call quality requirements data in the call signal itself. The gateway then extracts or reads the call quality requirements data from each call and then stores that data in the call quality requirement data structure 220.

The packet-switched network performance parameters data structure 230 includes current and/or projected performance parameters of the network. Examples of network performance parameters data include call delay, packet loss, error rate, etc. The delays associated with a call include $d_1$, $d_2$, and $d_3$: $d_1$ is the time taken by the incoming gateway to packetize the voice signals; $d_2$ is the time taken by the outgoing gateway to reassemble the packets into voice signals; and $d_3$ is the time taken to relay the packets through the IP network and has a standard deviation $\sigma_3$. In one embodiment, the incoming and outgoing gateways are the gateways closest to the calling party and the called party, respectively. The delays $d_1$, and $d_2$ are functions of $\lambda_i^{(j)}$ and $\lambda_o^{(j)}$, the rate of incoming and outgoing calls at gateway j, respectively. The packet loss $\rho$ and the delay $d_3$ are both functions of the IP network and traffic. Although $d_1$, and $d_2$ have means $\mu_1$ and $\mu_2$ and standard deviations $\sigma_1$ and $\sigma_2$ respectively, the standard deviations $\sigma_1$ and $\sigma_2$ are assumed to be small so that the actual delay, $d_{actual}=(d_1+d_2+d_3)$ has mean $\mu=(\mu_1+\mu_2+\mu_3)$ and standard deviation $\sigma_3$.

The network performance parameters data can be accumulated by each gateway such that each gateway keeps up-to-date data. Alternatively, the gateway ascertains the network performance parameters data by accessing quality of service computer 320 of FIG. 4 that determines the appropriate data for each gateway.

Memory 200 stores the dynamic call admission instructions 240 adapted for execution by processor 250. The term "adapted for execution" is meant to encompass any instructions that are ready for execution in their present form (e.g., machine code) by processor 250, or require further manipulation (e.g., compilation, decryption, or provided with an access code, etc.) to be ready for execution by processor 250. The dynamic call admission instructions 240 can determine and indicate when a call has been received by the admission control gateway 100. The call can then be placed into a queue or otherwise controlled. In some applications of the present invention, the dynamic call admission instructions 240 track how much time has passed since a call was received by the admission control gateway 100 so that the appropriate call action can be taken. In addition, the dynamic call admission instructions 240 can ascertain and make available information about the call such as calling party's ANI, the called party's phone number or IP address, and the type of call requested (e.g., voice call, data call, etc.).

The dynamic call admission instructions 240 also can determine for each call the appropriate call action based upon a call quality requirement and a network performance parameter. For example, a call has maximum bounds for delay and packet loss, which are $d(\mu_{maximum}, \sigma_{maximum})$ and $\rho_{maximum}$, respectively. One call action may be to hold a call in a queue if it is determined that any of the current measured parameters $\mu$, $\sigma_3$, and $\rho$ exceed the maximum boundaries. Furthermore, as the call is held in queue, $\mu$, $\sigma_3$, and $\rho$ are updated every $t_k$ seconds. The call is admitted to the network when the updated parameters are less than the respective maxima.

In particular, in one embodiment of the present invention, a VoIP call arrives at the gateway at time $t_k$. The VoIP call is admitted to the IP network based on the following steps:

1. The call characteristic requirements data $\mu_{maximum}$, $\sigma_{maximum}$, and $\rho_{maximum}$, are determined;
2. The network characteristic parameters data $\mu(t_k)$, $\sigma(t_k)$, and $\rho(t_k)$ are determined;
3. If $\mu(t_k) \leq \mu_{maximum}$, $\sigma(t_k) \leq \sigma_{maximum}$, and $\rho(t_k) \leq \rho_{maximum}$, the call is admitted to the IP network;
4. If any one of $\mu(t_k)$, $\sigma(t_k)$, or $\rho(t_k)$ exceeds its respective maximum bound, then the call is held in a queue; and
5. At $t_{k+1}$, set k+1=k and go to step 1.

In this particular embodiment, the VoIP call is held in the queue until the call is admitted to the IP network. Alternative call actions can provide that the call is held in the queue for a specified amount of time; and if the call has not been admitted to the IP network within that time, then the call is routed over a conventional circuit-switched network to the called party. Another call action can provide for a call back to the calling party when the call can be admitted to the IP network. Instead of holding the call in the queue, the call action can also be to send the calling party a distinctive busy signal or message that indicates that the IP network cannot handle the call at the present moment.

Figure 4:
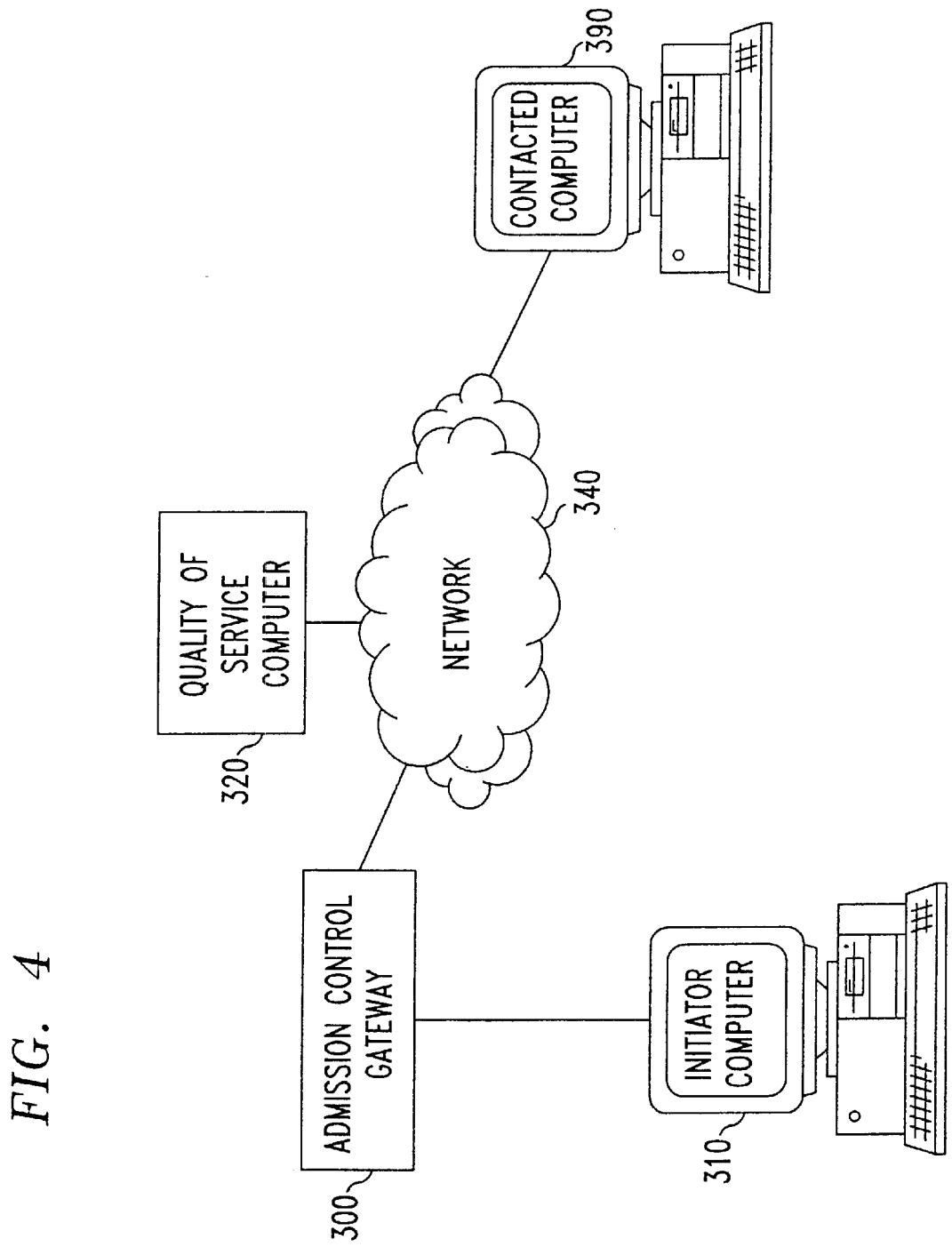
FIG. 4 shows a system with a quality of service computer in accordance with an embodiment of the present invention.

FIG. 4 is an example of another embodiment of the present invention that admits calls from an initiator computer 310 to a contacted computer 390 when the parameters of network 340 satisfy certain requirements. In this embodiment, the calls from the initiator computer 310 can be voice calls and/or data calls such as multimedia communications, HTTP commands, FTP commands, TELNET commands, etc. The admission control gateway 300 receives the call from the initiator computer 310, determines the call quality requirements, determines the network performance parameters from information provided by a quality of service computer 320, and takes a call action based on the determined call quality requirements and network performance parameters. The quality of service computer 320 is able to keep up-to-date data parameters about the network, the current traffic, and/or projected traffic by methods well known in the art, including polling every other gateway in the network, receiving data from network components such as routers (not shown), and/or accessing data concerning historical and cyclical traffic patterns (e.g., peak voice call traffic occurs between certain hours weekdays, peak residential data calls occur between certain hours each day, etc.).

Figure 5:
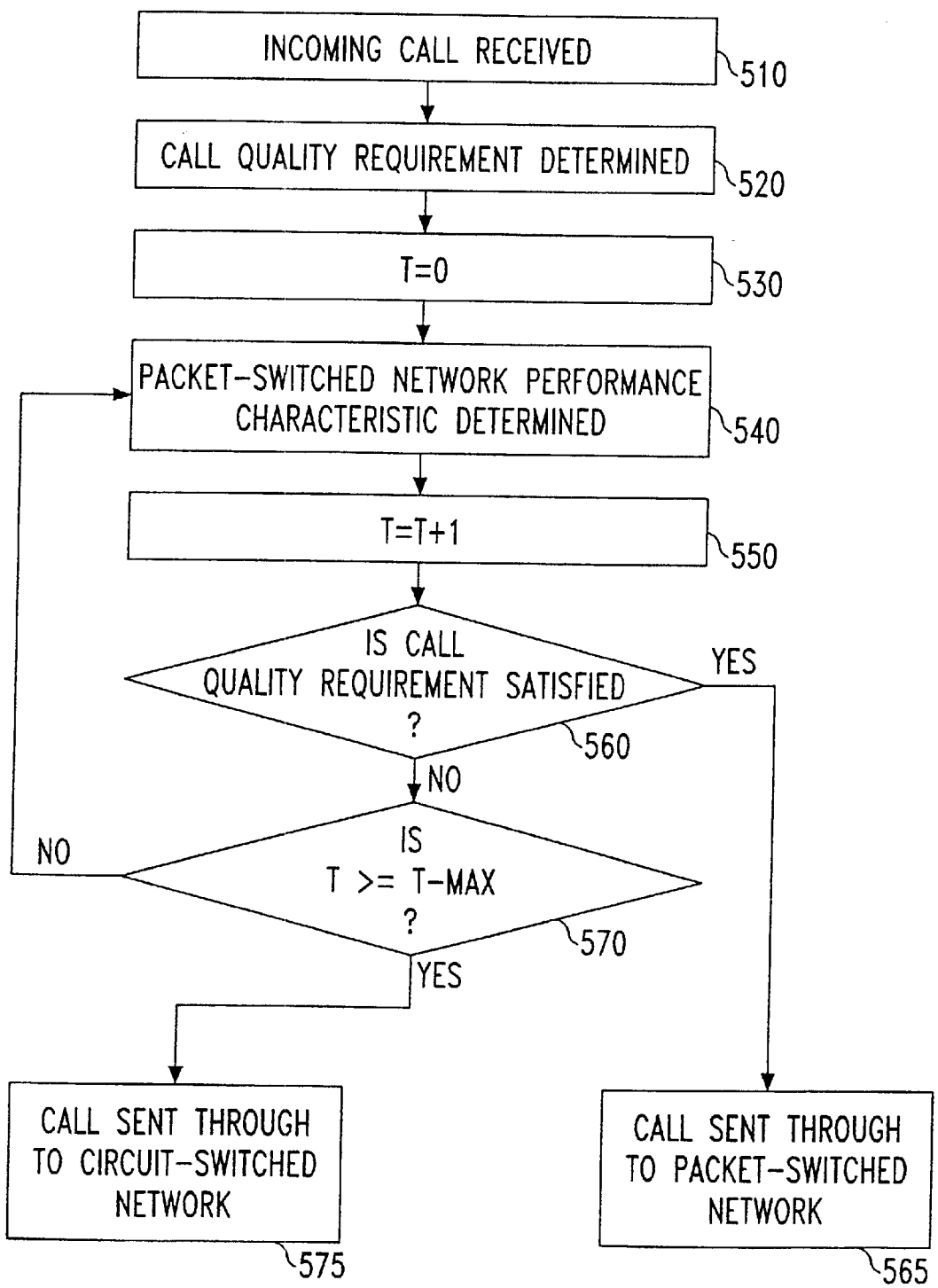
FIG. 5 is a flowchart illustrating a method in accordance with an embodiment of the present invention whereby a voice call is rerouted over another network when the call quality requirements are not satisfied within a set maximum time.

FIG. 5 illustrates exemplary steps whereby an embodiment of the present invention reroutes a voice call over another network, such as a conventional circuit-switched network, when the call quality requirements are not satisfied within a set maximum time measured after the voice call is received by the admission control gateway. After an incoming call is received (step 510), call quality requirements are determined (e.g., a typical delay requirement, a delay variation requirement) (step 520) and time variable T is set to equal 0 (step 530). The packet-switched network performance parameters are determined (e.g., a typical delay parameter, a delay variation parameter) (step 540), and time variable T is incremented (step 550). The determined network performance parameters are compared to the determined call quality requirements to ascertain whether the call quality requirements are satisfied (step 560). If the network performance parameters satisfy the call quality requirements, the call is admitted to the packet-switched network (step 565). On the other hand, if the call quality requirements are not satisfied, the time variable T is compared to a certain maximum value (step 570). If T equals or exceeds the maximum value, then the call is routed to a conventional circuit-switched network (step 575). If T does not equal or exceed the maximum value, then the packet-switched network performance parameters are determined again (step 540), the time variable T is again incremented (step 550), etc. Thus, the call is admitted to the packet-switched network if the call quality requirements are satisfied within a certain amount of time, or the call is routed through to a conventional circuit-switched network if the call quality requirements are not satisfied within a certain amount of time.

FIG. 6 illustrates exemplary steps whereby an embodiment of the present invention can be used in conjunction with a service that markets a certain level of network performance to network users placing calls over the network. An account for each user (e.g., a network access user account) may be charged a reduced rate if the network performance for a call is below the marketed level of performance. In particular, and referring to FIG. 6, after an incoming call is received (step 610), call quality requirements are determined (e.g., a typical delay requirement, a delay variation requirement) (step 620); network performance parameters are determined (e.g., a typical delay parameter, a delay variation parameter) (step 630); and the determined network performance parameters are compared to the determined call quality requirements to ascertain whether the call quality requirements are satisfied (step 640). If the network performance parameters do not satisfy the call quality requirements, the network access user account is charged a discounted rate (step 655) and the call is admitted to the network (step 660). On the other hand, if the call quality requirements are satisfied, the network access user account is charged the standard rate (step 650) and the call is admitted to the network (step 660).

In another embodiment of the invention, after a first call action is taken to admit a call to the packet-switched network, a second call action can be performed when the performance parameters of the network no longer satisfy the call quality requirements. For example, periodically during the call (e.g., at specific time intervals) the determined call quality requirements are compared to updated, determined performance parameters to ascertain whether the call quality requirements are still satisfied. When the call quality requirements are no longer satisfied, a second call action can reroute the call over another network. Another second call action may be to charge a discounted rate for the call if the network performance parameters do not satisfy the call quality requirements at a point during the call. Alternatively, the second call action may be to charge a discounted rate for the period of the call during which the network performance parameters do not satisfy the call quality requirements.

Thus, the present invention provides a method and apparatus whereby the admission of calls into a packet-switched network can be dynamically controlled. Performance of the network can be monitored and the admission of a call to the network is controlled to allow the call into the network when a certain level of call quality is met. Call quality can thereby be maintained at an acceptable level.

The invention has been described in conjunction with the preferred embodiment. It is evident that numerous alternatives, modifications, and uses will be apparent to those skilled in the art in light of the foregoing description.

What is claimed is:

1. A method for regulating the admission of a call to a packet-switched network, comprising:

determining a delay characteristic requirement of the call, said requirement including a typical delay requirement and a delay variation requirement;

determining a delay characteristic parameter of the packet-switched network, said parameter including a typical delay parameter and a delay variation parameter; and holding the call if the determined delay characteristic parameter does not satisfy the determined delay characteristic requirement.

2. The method of claim 1, wherein the call is held over a predetermined period of time.

3. The method of claim 2, further comprising:

updating the determined typical delay parameter and the delay variation parameter.

4. The method of claim 3, further comprising:

admitting the call to the packet-switched network if the updated typical delay parameter and the updated delay variation parameter are within prescribed call quality requirements.

5. The method of claim 3, further comprising:

routing the call to another network.

6. The method of claim 5, wherein said routing takes place if the updated determined typical delay parameter does not satisfy the determined typical delay requirement.

7. The method of claim 5, wherein said routing takes place if the updated determined delay variation parameter does not satisfy the determined delay variation requirement.

8. The method of claim 3, further comprising:

sending a wait message to a calling party.

9. The method of claim 3, further comprising:

sending a busy signal to a calling party.

10. The method of claim 5, further comprising:

providing a calling party an option of being called back when the call is admitted to the packet-switched network if the updated typical delay parameter and the updated delay variation parameter are within prescribed call quality requirements.

11. The method of claim 1, wherein the delay characteristic requirement further includes a packet loss requirement.

12. The method of claim 1, wherein the delay characteristic parameter further includes a packet loss parameter.

13. The method of claim 1, wherein said call is a voice call.

14. The method of claim 1, wherein said call is a data call.

15. The method of claim 1, wherein said packet-switched network is an Internet Protocol (IP) network.

16. A system for regulating the admission of a call to a packet-switched network, comprising:

means for determining a delay characteristic requirement of the call, the requirement including a typical delay requirement and a delay variation requirement;

means for determining a delay characteristic parameter of the packet-switched network, the parameter including a typical delay parameter and a delay variation parameter; and means for holding the call for a predetermined amount of time if the determined delay characteristic parameter does not satisfy the determined delay characteristic requirement.

17. The system of claim 16, further comprising:

means for updating the determined typical delay parameter and the delay variation parameter.

18. The system of claim 17, further comprising:

means for admitting the call to the packet-switched network if the updated typical delay parameter and the updated delay variation parameter are within prescribed call quality requirements.

19. The system of claim 18, further comprising:

means for sending messages to a calling party if while the call is on hold.

20. An apparatus for controlling the admission of a call into a packet-switched network, comprising:

a processor; and a memory, coupled to said processor, storing a plurality of instructions adapted for execution by said processor to:

determine a delay characteristic requirement of the call, said requirement including a typical delay requirement and a delay variation requirement;

determine a delay characteristic parameter of the packet-switched network, said parameter including a typical delay parameter and a delay variation parameter; and hold the call for a predetermined period of time if the determined delay characteristic parameter does not satisfy the determined delay characteristic requirement.

* * * * *